United States Patent
Graumann

(10) Patent No.: US 7,139,704 B2
(45) Date of Patent: Nov. 21, 2006

(54) METHOD AND APPARATUS TO PERFORM SPEECH RECOGNITION OVER A VOICE CHANNEL

(75) Inventor: David L. Graumann, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 10/000,228

(22) Filed: Nov. 30, 2001

(65) Prior Publication Data
US 2003/0105635 A1   Jun. 5, 2003

(51) Int. Cl.
*G10L 15/00* (2006.01)
(52) U.S. Cl. ............... 704/231; 704/201; 704/270.1; 381/88.01
(58) Field of Classification Search ......... 704/270.1, 704/233, 256, 246, 257, 251, 255, 231, 270, 704/275, 201; 379/88.01
See application file for complete search history.

(56) References Cited

U.S. PATENT DOCUMENTS

| | | | | |
|---|---|---|---|---|
| 5,483,579 A | * | 1/1996 | Stogel | 379/88.03 |
| 5,666,400 A | * | 9/1997 | McAllister et al. | 379/88.01 |
| 5,668,854 A | * | 9/1997 | Minakami et al. | 379/88.18 |
| 5,727,124 A | * | 3/1998 | Lee et al. | 704/233 |
| 5,754,978 A | * | 5/1998 | Perez-Mendez et al. | 704/255 |
| 5,758,322 A | * | 5/1998 | Rongley | 704/275 |
| 5,822,727 A | * | 10/1998 | Garberg et al. | 704/270.1 |
| 5,884,262 A | * | 3/1999 | Wise et al. | 704/270.1 |
| 5,956,683 A | | 9/1999 | Jacobs et al. | |
| 5,960,399 A | * | 9/1999 | Barclay et al. | 704/270.1 |
| 5,995,928 A | * | 11/1999 | Nguyen et al. | 704/251 |
| 6,133,904 A | * | 10/2000 | Tzirkel-Hancock | 345/589 |
| 6,161,090 A | * | 12/2000 | Kanevsky et al. | 704/246 |
| 6,178,404 B1 | * | 1/2001 | Hambleton et al. | 704/275 |
| 6,292,781 B1 | | 9/2001 | Urs et al. | |

OTHER PUBLICATIONS

Weiqi Zhang et al., "The Study on Distributed Speech Recognition System", 2000 IEEE International Conference On Acoustics, Speech, and Signal Processing, vol. 3 of 6, Jun. 5, 2000, pp. 1431-1434, XP-002233412.

* cited by examiner

*Primary Examiner*—Vijay Chawan
(74) *Attorney, Agent, or Firm*—Kacvinsky LLC; John F. Kacvinsky

(57) ABSTRACT

A method and apparatus to perform speech recognition over a voice channel is described.

38 Claims, 6 Drawing Sheets

METHOD AND APPARATUS TO PERFORM SPEECH RECOGNITION OVER A VOICE CHANNEL

BACKGROUND

Speech recognition technology is becoming increasingly popular to access automated systems. For example, speech recognition may be used to remotely navigate automated voice response systems, access voice enabled Internet portals, control home automation systems, and so forth. Many voice channels, however, may not have been designed to accommodate improvements in speech recognition technology. This may be particularly true with respect to wireless communication technology. As a result, there may be a need to improve speech recognition over voice channels such as found in mobile or cellular communication systems.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
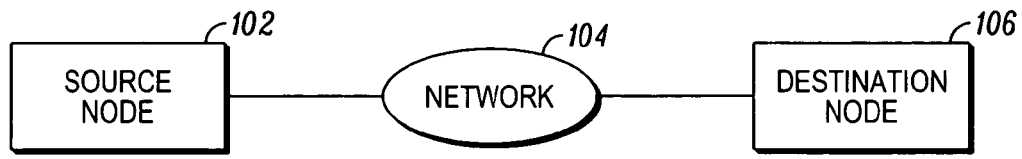
FIG. 1 is a system suitable for practicing one embodiment of the invention.

The embodiments of the invention may be directed to distributed speech recognition by voice encoder/decoder ("vocoder") subrogation. Vocoder subrogation may refer to replacing a conventional voice compression scheme with a lower bandwidth substitute designed to improve speech recognition performance. The term "replacing" as used herein may refer to substituting all or a portion of one set of information with another set of information. One embodiment of the invention depicts a way to establish a protocol to switch to the lower bandwidth scheme when appropriate to provide speech recognition information, such as a voice command in response to a prompt from an automated system. More particularly, one embodiment of the invention encodes speech features from one endpoint and overlays the speech features on the vocoder bit stream representing the encoded speech. The other endpoint may then receive and decode the speech features for use with a speech recognition module or device.

One embodiment of the invention may comprise a method and apparatus to perform speech recognition over a voice channel, such as a voice channel that is part of a mobile or cellular communication system. One embodiment of the invention may comprise a speech recognition encoder and a speech recognition decoder. The speech recognition encoder may replace bits of information representing speech with bits of information representing speech features. The speech features may be communicated over a voice channel for a network, such as a wireless network. The speech recognition decoder may receive the speech features and perform speech recognition. The process of encoding and decoding speech features to replace speech may be referred to herein as "subrogation."

Embodiments of the invention may have several advantages. For example, mobile or cellular communication systems utilize radio-frequencies (RF) to communicate information between devices. The RF may be separated into one or more voice channels. These voice channels, however, are limited in terms of the amount of information that may be communicated, which is often measured in terms of bandwidth (BW). To better utilize the BW of an existing mobile communication voice channel, many mobile systems employ compression technologies to decrease the number of bits needed to represent speech. One embodiment of the invention may decrease this number further by replacing the bits representing speech with bits representing speech features for the speech. In addition, the speech features may be compressed prior to the replacement process thereby further reducing the bits used to represent the speech features. This embodiment of the invention may be implemented using conventional wireless technology with additional hardware and/or software to implement the functionality described herein.

In this detailed description, numerous specific details are set forth in order to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

An embodiment of the invention may include functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Referring now in detail to the drawings wherein like parts are designated by like reference numerals throughout, there is illustrated in FIG. 1 a system suitable for practicing one embodiment of the invention. FIG. 1 is a block diagram of a speech recognition system 100. Speech recognition system 100 may comprise a source node 102 and a destination node 106 connected by a network 104. In one embodiment of the invention, source node 102 may comprise, for example, a mobile station (MS), such as a mobile telephone or cellular telephone. In one embodiment of the invention, destination node 106 may comprise, for example, a mobile base station (BS) or mobile telephone switching office (MTSO). In one embodiment of the invention, network 104 comprises a wireless network using RF spectrum as a communications medium to communicate information between source node 102 and destination node 106.

It is worthy to note that any subrogation functionality described with respect to a BS, MS, MTSO or network may potentially be implemented elsewhere within system 100 and still fall within the scope of the invention. For example, detecting subrogation capabilities for a MS may be initiated by the BS, MS, MTSO or elsewhere in the network and still fall within the scope of the invention.

Destination node 106 may include an application server configured with hardware and/or software to operate as an automated system (not shown) capable of accepting speech recognition output. Speech recognition output may comprise, for example, speech-to-text output. The term "automated system" as used herein may refer to a system that operates with limited human intervention. An example of an automated system may comprise, for example, an IVR system, an Internet voice portal, a home automation system and automated directory assistance application, although the embodiments of the invention are not limited in this context.

Figure 2:
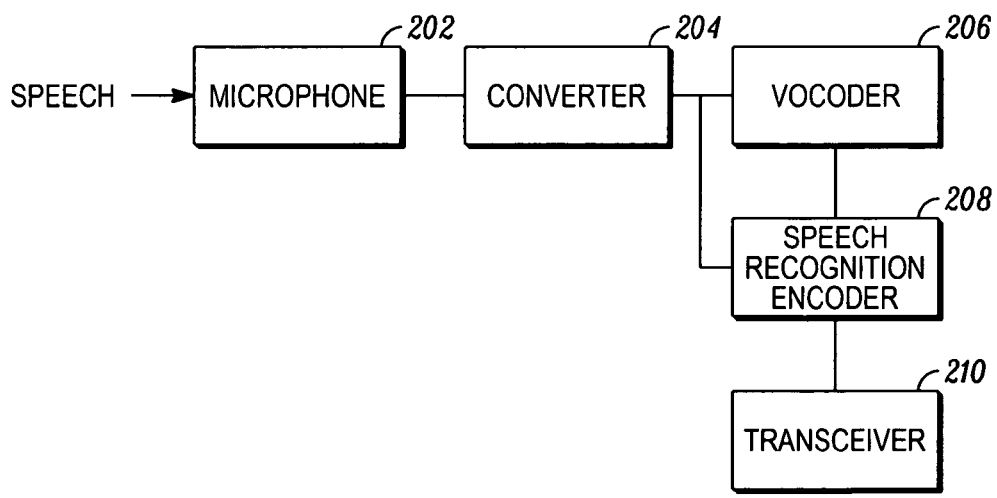
FIG. 2 is a block diagram of a source node in accordance with one embodiment of the invention.

FIG. 2 is a block diagram of a source node in accordance with one embodiment of the invention. FIG. 2 illustrates a source node 200 that may represent, for example, source node 102. In one embodiment of the invention, source node 200 may comprise a microphone 202, a converter 204, a vocoder 206, a speech recognition encoder 208 and a transceiver 210.

In one embodiment of the invention, microphone 202 may receive analog speech signals from, for example, a human speaker. Microphone 202 may send the analog speech signals to converter 204.

In one embodiment of the invention, converter 204 may be, for example, and analog-to-digital (A/D) converter. Converter 204 may convert the analog speech signals into digital speech signals represented as a sequence or stream of bits. Each bit may represent, for example, a one (1) or a zero (0). Converter 204 may send to the stream of bits to vocoder 206 and speech recognition encoder 208.

Vocoder 206 may implement any conventional voice compression algorithm to reduce the digital speech signals. For example, in one embodiment of the invention vocoder 206 may implement a voice compression scheme in accordance with International Telecommunications Union (ITU) Recommendation G.723.1 titled "Dual Rate Speech Coder For Multimedia Communications Transmitting at 5.3 and 6.3 kbps," approved March 1996 ("G.723 Specification"). In another example, vocoder 206 may implement a voice compression scheme in accordance with any standard associated with Global System for Mobile Communications (GSM).

In one embodiment of the invention, vocoder 206 may implement a voice compression algorithm resulting in a higher BW than the subrogation process described herein. Vocoder 206 may also organize the stream of bits that comprise the digital speech signals into discrete frames. A frame may represent a logical set of bits having a fixed or variable length. Vocoder 206 may send the frames to speech recognition encoder 208.

Speech recognition encoder 208 enhances speech recognition and decreases BW requirements for a voice channel that may be part of network 104. Speech recognition encoder 208 may extract and compress speech features from the digital speech signals to form a frame of bits. The frames of compressed speech features may then be overlaid on the frames of compressed speech received from vocoder 206, and passed to transceiver 210 for transmission over network 104. Speech recognition encoder 208 may be discussed in more detail with reference to FIG. 3.

Transceiver 210 may comprise a transmitter, receiver and logic sections for a MS, BS or MTSO. The transmitter may convert low-level audio signals to proportional shifts in the RF carrier frequency. The receiver may amplify and demodulate low-level RF signals into their original audio form. The control section may coordinate this operation by the insertion and extraction of appropriate system control messages. Transceiver 210 may be connected to an antenna assembly (not shown).

Figure 3:
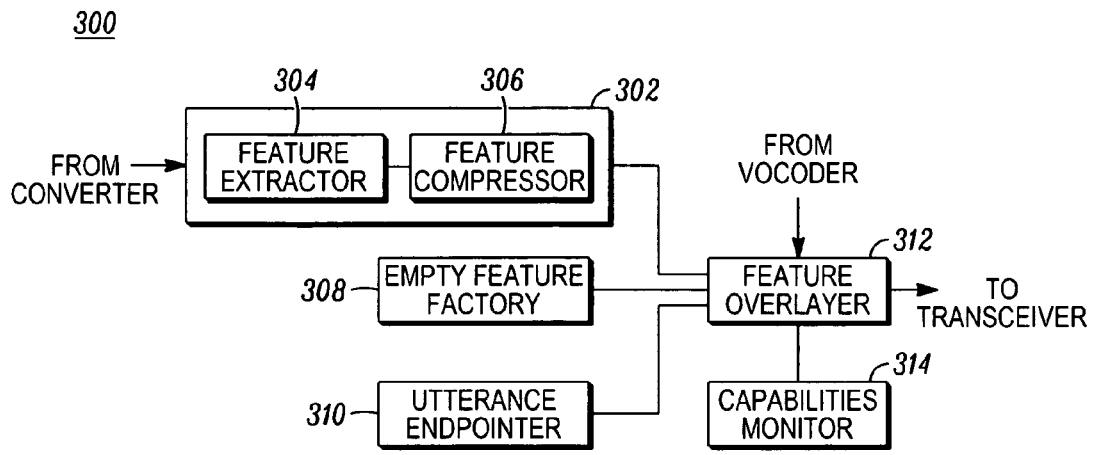
FIG. 3 is a block diagram of a speech recognition encoder in accordance with one embodiment of the invention.

FIG. 3 is a block diagram of a speech recognition encoder in accordance with one embodiment of the invention. FIG. 3 illustrates a speech recognition encoder 300 that may be implemented, for example, as part of source node 102. Speech recognition encoder 300 may comprise, for example, a feature encoder 302, an empty feature factory 308, an utterance endpointer 310, a feature overlayer 312 and a capabilities monitor 314.

Feature encoder 302 may further comprise a feature extractor 304 and a feature compressor 306. Feature extractor 304 may extract speech features from an input speech signal, such as the digital speech signals from converter 204. The speech feature may comprise, for example, feature vectors. In one embodiment of the invention, feature extractor 304 may extract speech features in accordance with the European Telecommunications Standards Institute (ETSI) Standard ES 201 108 v. 1.1.2 titled "Speech Processing, Transmission and Quality aspects (STQ); Distributed speech recognition; Front-end feature extraction algorithm; Compression algorithms," approved in April 2000 ("Aurora Specification").

In another embodiment of the invention, the input speech signals may represent the analog speech signals received by microphone 202 and passed to speech recognition encoder 300. Any conventional algorithm for extracting speech features may be implemented by feature extractor 304 and fall within the scope of the invention. Feature compressor 306 may compress the speech features into a reduced number of bits using any conventional compression algorithm. The compressed speech features may be passed to feature overlayer 312.

Empty feature factory 308 may provide fixed low bit-rate vectors to be used by feature overlayer 312 during silent periods on a converter. These vectors may be predetermined and not extracted from the converter as in feature encoder 302. The use of feature encoder 302 or empty feature factory 308 in feature overlayer 312 may be controlled by utterance endpointing determination in utterance endpointer 310.

Utterance endpointer 310 may implement any conventional voice activity detection scheme to determine the start point and end point for speech utterances and identify silent periods. Feature overlayer 312 may use this information to control the overlaying of speech features or silence periods on the vocoder bit stream. Utterance endpointer 310 may monitor speech and may indicate active speech to feature overlayer 312. Features may then be overlaid if capabilities monitor 314 indicates this mode may be appropriate. When the speaker stops talking, utterance endpointer 310 may indicate no speech activity and the "empty feature" from empty feature factory 308 may be used. This may be desired, for example, to keep synchronization with BS 106.

Feature overlayer 312 may organize the compressed speech features into frames of bits, with the frame size matching the frame size used by vocoder 206, for example. This function may also be implement as part of feature encoder 302, if desired. Feature overlayer 312 may replace the frames of bits representing speech as encoded by vocoder 206 with the frames of bits representing speech features as encoded by feature encoder 302. Feature overlayer 312 may also overwrite the vocoder bits with various signaling patterns used to control the subrogation process, such as indicating subrogation capabilities, subrogation start points and end points, and other protocol type information.

Capabilities monitor 314 may detect if a destination node is capable of accepting the subrogation bit stream. Capabilities monitor 314 may monitor for a request for speech recognition information. Speech recognition information may include, for example, a prompt for a voice command and a subrogation indicator. The term "voice command prompt" as referred to herein may comprise any request for spoken information from an automated system, such as an IVR system. The subrogation indicator may be, for example, a predefined bit pattern embedded within the vocoder bit stream. In one embodiment of the invention, the bit pattern may be inaudible or nearly inaudible so to reduce user distraction. Once detected, capabilities monitor 314 may notify the speech recognition encoder to begin the subrogation scheme for transmission. In the event that the destination node is not capable of accepting the subrogation bit stream, the speech recognition encoder may be bypassed and normal vocoder operations resumed. This may be indicated by receipt of a voice command prompt without receipt of a subrogation indicator within a certain time interval. Due to the "lossy" nature of wireless voice channels, a weighted match algorithm may be used to detect the presence or absence of the voice command prompt and/or subrogation indicator.

Figure 4:
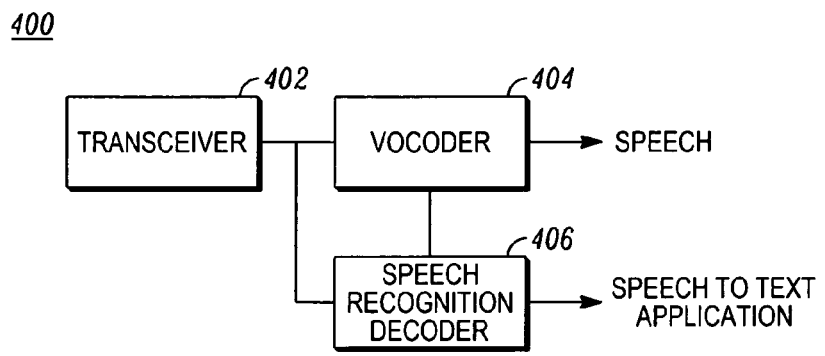
FIG. 4 is a block diagram of a destination node in accordance with one embodiment of the invention.

FIG. 4 is a block diagram of a destination node in accordance with one embodiment of the invention. FIG. 4 illustrates a destination node 400 that may represent, for example, destination node 106. Destination node 400 may comprise, for example, a transceiver 402, a vocoder 404 and a speech recognition decoder 406. Transceiver 402 and vocoder 404 are similar to transceiver 210 and vocoder 206, respectively. The output of speech recognition decoder 406 may be used by any speech recognition application, such as a speech to text application for automated systems.

Figure 5:
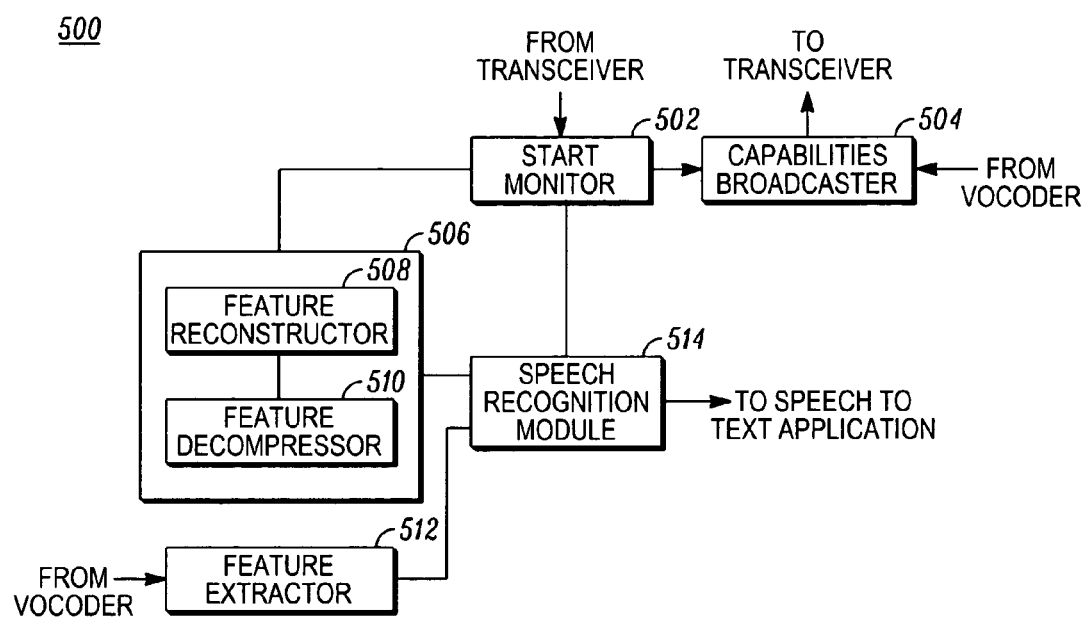
FIG. 5 is a block diagram of a speech recognition decoder in accordance with one embodiment of the invention.

FIG. 5 is a block diagram of a speech recognition decoder in accordance with one embodiment of the invention. FIG. 5 illustrates a speech recognition decoder 500. Speech recognition decoder 500 may comprise a start monitor 502, a capabilities broadcaster 504, a feature decoder 506, a feature extractor 512 and a speech recognition module 514.

Feature decoder 506 may further comprise a feature reconstructor 508 and a feature decompressor 510. Feature reconstructor 508 may strip off subrogation signaling fields and concatenate speech feature fragments received from a source node in one or more frames into full speech feature packets. Reconstructed packets may be sent to feature decompressor 510.

Feature decompressor 510 may reconstitute the speech features from the compressed speech feature packet. Feature decompressor 510 may also apply any error correction provided by the speech recognition encoder. The speech features may be passed to speech recognition module 514.

Speech recognition module 514 may decode the speech features into text. Speech recognition module 514 may represent a sub-set of self-contained speech recognition engines in that it does not input a digital speech signal and apply feature extraction. Rather, it receives as input the pre-extracted features sent from the source node. The text may be used by any automated system or conventional speech-to-text application.

Feature extractor 512 may be similar to feature extractor 304 of speech recognition encoder 302. Feature extractor 512 may extract speech features from speech decoded from vocoder 404 in the case where a destination node does not have subrogation capabilities. In this case, start monitor 502 may send a signal to speech recognition 514 to use the output of feature extractor 512 to perform speech recognition rather than the output of feature decoder 506.

Figure 6:
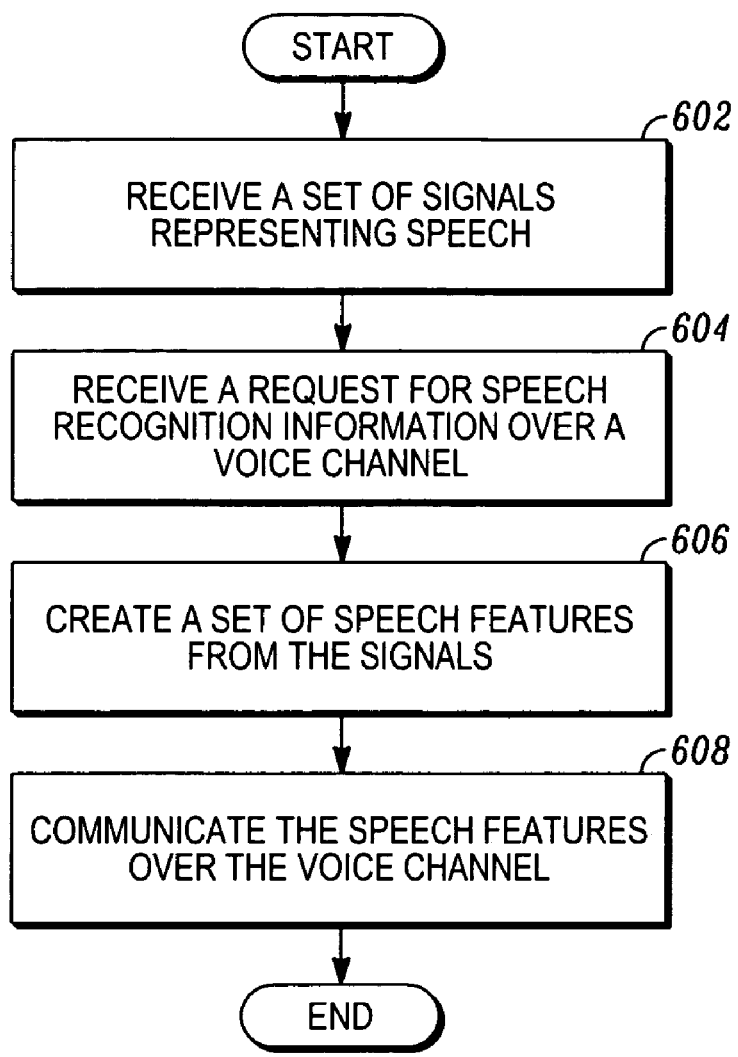
FIG. 6 is a first block flow diagram of programming logic performed by a speech recognition system in accordance with one embodiment of the invention.
Figure 7:
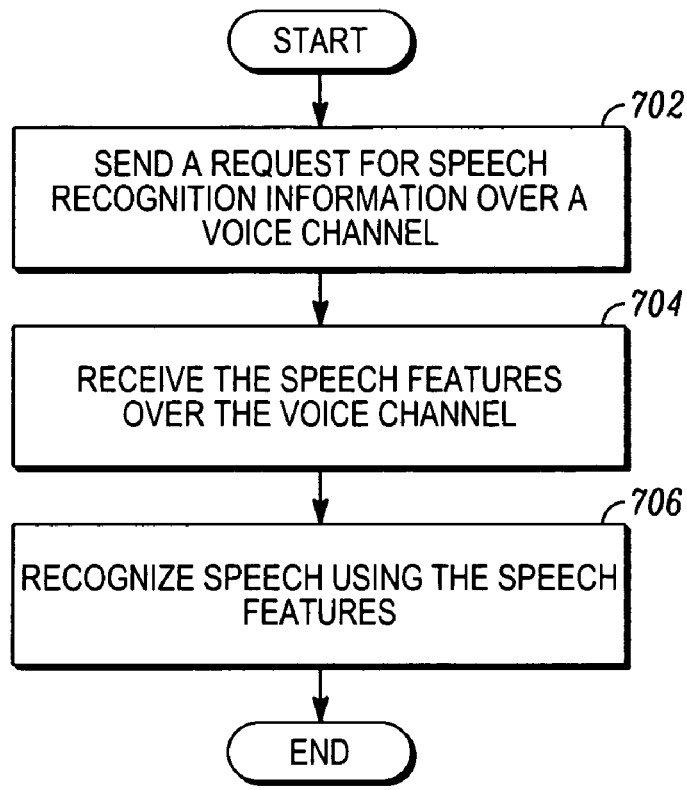
FIG. 7 is a second block flow diagram of programming logic performed by a speech recognition system in accordance with one embodiment of the invention.
Figure 8:
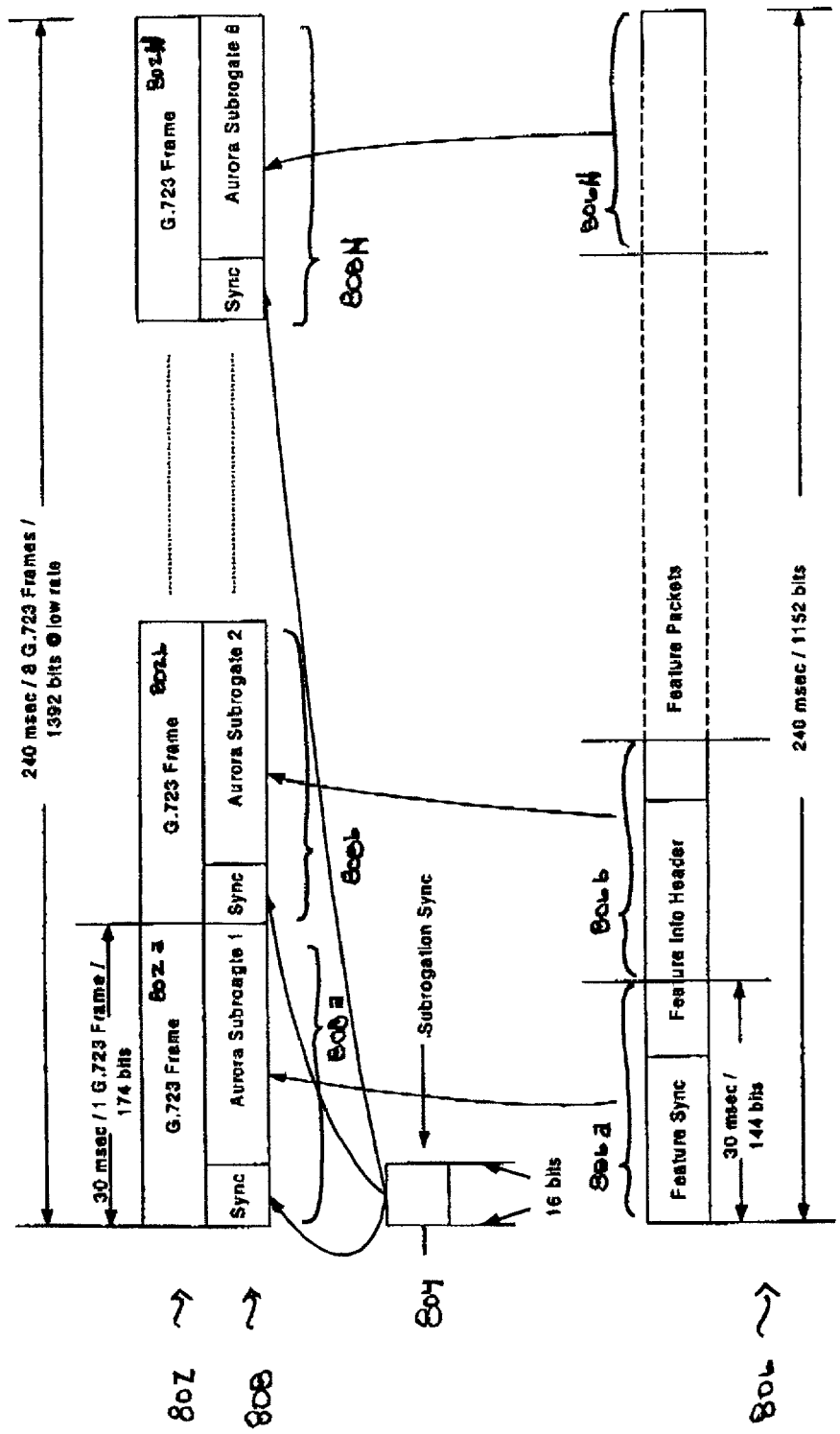
FIG. 8 is an example of a subrogation overlay in accordance with one embodiment of the invention.

The operations of systems 100–500 may be further described with reference to FIGS. 6–8 and accompanying examples. Although FIGS. 6–8 presented herein may include a particular processing logic, it can be appreciated that the processing logic merely provides an example of how the general functionality described herein can be implemented. Further, each operation within a given processing logic does not necessarily have to be executed in the order presented unless otherwise indicated.

FIG. 6 is a first block flow diagram of programming logic performed by a speech recognition system in accordance with one embodiment of the invention. FIG. 6 illustrates programming logic 600 to perform speech recognition. A set of signals representing speech may be received at block 602. A request for speech recognition information may be received over a voice channel at block 604. A set of speech features may be created from the signals at block 606. The speech features may be communicated over the voice channel at block 608.

In one embodiment of the invention, the request may comprise receiving a prompt for a voice command. The request may also include receiving a subrogation indicator, such as a predefined pattern of bits. In yet another embodiment of the invention, the request may comprise only a subrogation indicator.

In one embodiment of the invention, a set of speech features may be created by extracting speech features from the speech signals. The speech features may then be compressed, and any error correction may be applied to the compressed speech features.

In one embodiment of the invention, the speech features may be communicated over the voice channel by creating a first stream of bits representing the speech. A second stream of bits representing the speech features may be received from, for example, the feature encoder. The first stream of bits may be replaced by the second stream of bits, and sent over the voice channel.

In one embodiment of the invention, the first stream of bits may be created by receiving an analog audio waveform representing the speech. The analog audio waveform may be converted into a digital audio signal. The digital audio signal may be compressed using a voice encoding algorithm.

In one embodiment of the invention, the first stream of bits may be replaced by the second stream of bits by determining a start point and an end point for the first stream of bits. A start point and an end point may also be determined for the second stream of bits. The first stream of bits may be replaced with the second stream of bits using the start points and end points to synchronize the replacement.

In one embodiment of the invention, the first stream of bits may be replaced with the second stream of bits using the start points and end points by creating a frame of bits from the start point of the first stream of bits. The frame of bits may be overlaid beginning with the start point for the second stream of bits. The frame may be sent over the voice channel. This process may be repeated until the end point for the second stream of bits is reached.

In one embodiment of the invention, the second stream of bits may be sent over the voice channel by inserting a start indicator before the start point for the second stream of bits, and an end indicator after the end point for the second stream of bits. The second stream of bits may be sent with the start and end indicators.

FIG. 7 is a second block flow diagram of programming logic performed by a speech recognition system in accordance with one embodiment of the invention. FIG. 7 illustrates programming logic 700 to perform speech recognition. A request for speech recognition information may be sent over a voice channel at block 702. The speech features may be received over the voice channel at block 704. The speech may be recognized using the speech features at block 706.

In one embodiment of the invention, the request for speech recognition may be sent over a voice channel in the form of a prompt for a voice command and/or a subrogation indicator. The subrogation indicator may be a predefined pattern of bits.

In one embodiment of the invention, the speech features may be received over the voice channels by determining a start point and end point for a stream of bits. The speech features may be reconstructed from the start point. The reconstructed speech features may be decompressed to form the original speech features. The decompressed speech features may be sent to speech recognition device. This process may continue until the end point is reached.

In one embodiment of the invention, error correction may be performed by extracting error correction information from the stream of bits. A determination may be made as to whether the speech features include errors using the error correction information.

FIG. 8 is an example of a subrogation overlay in accordance with one embodiment of the invention. The subrogation overlay process described in FIG. 8 may use an Internet Protocol (IP) telephony example using techniques described in the G.723 Specification and Aurora Specification, although the embodiments of the invention are not limited in this context. Once the initial capabilities protocol has established that subrogation can commence, the bit patterns of higher BW packets are replaced with lower BW packets. The feature overlayer and the feature reconstructor operate together to perform bit replacement. In this example, one Aurora feature frame describes 240 milliseconds (msec) of speech while one G.723 frame describes 30 msec of speech. Sections of the 144 bits that comprise the feature frame may be placed in consecutive G.723 frames. In accordance with the Aurora Specification, feature synchronization and feature header information precedes the actual feature bits. These operations may be transparent to the subrogation process. Additional bits may be used to maintain subrogation signaling synchronization between the two endpoints, e.g., source node and destination node. The subrogation synchronization bits may indicate which portion of the entire feature frame is being sent within the G.723 frame, including when the start and stop features occur. In an alternate embodiment of the invention, this may be accomplished using, for example, histograms of frame bits.

More particularly, FIG. 8 illustrates a first set of frames 802, a second set of frames 806, a third set of frames 808 and a subrogation synchronization block 804. In this example, frame set 802 includes eight frames 802a to 802h. In one embodiment of the invention, the frames are generated in accordance with the G.723 Specification, with all eight frames having 240 milliseconds (msec) of speech represented by a total of 1392 bits, and with each frame having 30 milliseconds (msec) of speech represented by 174 bits.

Frame set 806 may also contain eight frames 806a–806h. In one embodiment of the invention, the frames are generated in accordance with the Aurora Specification. Frame set 806 is also broken into 30 msec frames, with each frame represented by 144 bits. A single 30 msec frame of speech feature information, however, may represent 240 msec worth of speech, thereby representing a BW reduction by a factor of eight. Depending on the speech feature extraction technology used by a particular embodiment of the invention, the speech feature information may comprise, for example, feature synchronization information, feature header information and feature packets. The feature packets may comprise, for example, packets of bits representing speech features.

As shown in FIG. 8, the subrogation overlay process may comprise taking a frame of speech feature information, adding a synchronization header such as a subrogation synchronization block 804, and overlaying this information over a speech frame from frame set 802. For example, frame 806a of frame set 806 may be combined with subrogation synchronization block 804 and placed over frame 802a of frame set 802. Similarly, frame 806b of frame set 806 may be combined with subrogation synchronization block 804 and placed over frame 802b of frame set 802. This overlay process may continue until all the feature packets have been received by the speech recognition decoder at the destination node.

The operation of systems 100–500 and FIGS. 6–8 may be better understood by way of example. Assume source node 102 is a MS such as a cellular telephone. Assume destination node 106 is a BS connected to an application server having a software application to perform automated directory assistance. Source node 102 and destination node 106 communicate over a wireless network 104 that includes voice channels defined using RF spectrum. A user initiates a connection with the application server. The server provides some introductory information to the user on how to use the service. This information is sent using a normal voice compression scheme, such as GSM or G.723.

The server then gives a voice prompt for a name to initiate the directory assistance search. At destination node 106, capabilities broadcaster 504 may inject a subrogation indicator comprising an inaudible or nearly inaudible pattern into the normal vocoder bit stream to indicate that this endpoint is capable of accepting a subrogation bit stream. The pattern can be any predefined pattern and is a function of the particular vocoder used. In this example, the gain bits of G.723 may be set to their lowest setting and a physiologically improbable vector sequence may be used as the signaling pattern. This pattern may span several frames. In another example, a psycho-acoustical masking could also be employed as the pattern. Depending on the particular vocoder and pattern scheme, capabilities broadcaster 504 may need to be disabled so that responses from the automated system may be audible to the listener. If so, capabilities broadcaster 504 may be configured to enable and disable a subrogation start monitor such as start monitor 502.

At source node 102, capabilities monitor 314 may monitor for the subrogation indicator from destination node 106. Once detected, capabilities monitor 314 may notify speech recognition encoder 300 to begin the subrogation scheme to transmit the name of the person or business spoken by the user in response to the voice prompt by the automated system. If capabilities monitor 314 fails to detect a subrogation indicator, then the spoken name may be sent to the automated system using the normal voice compression scheme.

At destination node 106, start monitor 502 monitors for the start of a subrogation bit stream. Start monitor 502 may detect the beginning of a subrogation bit stream by receiving a start of subrogation pattern in the received bit stream. In this example, the pattern does not necessarily have to be inaudible if the pattern is not converted to audio signals for a listener. During the switch to the speech recognition decoding process, the vocoder may output a brief distorted signal, on the order of approximately 200 msec. In another embodiment of the invention, this may be avoided by adding system latency. In this example, start monitor 502 detects the start of subrogation pattern and sends a signal to speech recognition module 514 to use the output of feature decoder 506 as input for the speech recognition process. Start monitor 502 may switch this path in such a way to bit align the input subrogation frame content to the frame reconstruction process.

Referring again to source node 102, feature encoder 302 receives an input speech signal representing the spoken voice command, which in this case may be a name. Feature encoder 302 begins the speech feature extraction process in accordance with the Aurora Specification. In this example, feature extractor 304 uses a 16 kilohertz 16 bit sampling size for feature extraction. Feature extractor 304 sends the extracted speech features, or feature vectors, to feature compressor 306. Feature compressor 306 compresses the feature vectors to a lower BW bit stream, and may apply error correction as appropriate. This compressed bit stream may be passed to feature overlayer 312.

Feature overlayer 312 receives the compressed bit stream and begins the subrogation overlay process. Feature overlayer 312 receives the bit stream representing speech from vocoder 206, and overwrites the vocoder bits with signaling patterns and the feature vectors. Once capabilities monitor 314 detects a subrogation indicator, feature overlayer 312 may transmit a fixed start of features pattern within the vocoder packets. This may be followed by sequential bits extracted from the feature vectors that align with appropriate frame sizes of the vocoder. This may be accomplished in accordance with the process described with reference to FIG. 8.

At destination node 106, feature reconstructor 508 may begin stripping off subrogation signaling fields and concatenate feature fragments received from source node 102 back into full feature packets. The reconstructed feature packets may then be sent to feature decompressor 510. Feature decompressor 510 may reconstitute the feature vector and applies any error correction provided by feature compressor 306. The feature vectors may then be passed to speech recognition module 514.

Speech recognition module 514 may receive the feature vectors and convert them into text, or in this case the name of the person for which a number is desired. Speech recognition module 514 may comprise, for example, a self-contained speech recognition engine in the sense that it does not perform feature extraction, but rather receives previously extracted feature vectors as inputs for the speech recognition process. Speech recognition module 514 may send the text of the requested name to the automated directory assistance software, to begin the number lookup process.

In some instances, destination node 106 may receive voice commands from a source node that is not capable of sending a subrogation bit stream. In this case, start monitor 502 may switch the input of speech recognition module 514 to the output of feature extractor 512. Feature extractor 512 is similar to feature extractor 304, although in some cases feature extractor 512 may need to be configured to use the bit rate and sample size provided by the particular vocoder used. For example, this may be at 8 kilohertz with less than a 16 bit sample size.

In another example, detection of subrogation capabilities by a remote endpoint may occur during call set-up or establishment. This may reduce or obviate the need to perform the detection process on an utterance-by-utterance basis or per request for speech information basis. In this example, once subrogation capabilities are detected, all communication from a user over the MS may be sent over a voice channel using subrogation. Communications from an automated system or BS, however, may be sent over the voice channel in accordance with conventional voice compression techniques.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to perform speech recognition, comprising:
  receiving a set of signals representing speech;
  receiving a request for speech recognition information over a wireless voice channel in a wireless network, wherein receiving said request comprises receiving a subrogation indicator;
  creating a set of speech features from said signals; and
  when said subrogation indicator is detected:
  replacing said set of signals representing speech with said speech features; and
  communicating said speech features over said wireless voice channel in said wireless network at a lower bandwidth than a bandwidth used to send said set of signals representing said speech.

2. The method of claim 1, wherein said receiving said request comprises:
  receiving a prompt for a voice command.

3. The method of claim 1, wherein said subrogation indicator is a predefined pattern of bits.

4. The method of claim 1, wherein said creating comprises:
  extracting said speech features from said signals; and
  compressing said speech features.

5. The method of claim 4, further comprising applying error correction to said compressed speech features.

6. The method of claim 4, further comprising determining periods of silence in said signals.

7. The method of claim 1, wherein said communicating comprises:
   creating a first stream of bits representing said speech;
   receiving a second stream of bits representing said speech features;
   replacing said first stream of bits with said second stream of bits; and
   sending said second stream of bits over said voice channel.

8. The method of claim 7, wherein said creating comprises:
   receiving an analog audio waveform representing said speech;
   converting said analog audio waveform into a digital audio signal; and
   compressing said digital audio signal using a voice encoding algorithm.

9. The method of claim 7, wherein said replacing comprises:
   determining a start point and an end point for said first stream of bits;
   determining a start point and an end point for said second stream of bits; and
   replacing said first stream of bits with said second stream of bits using said start points and said end points.

10. The method of claim 9, wherein said replacing said first stream of bits with said second stream of bits using said start points and said end points, comprises:
    (a) creating a frame of bits from said start point for said first stream of bits;
    (b) overlaying said frame of bits with said start point for said second stream of bits;
    (c) sending said frame of bits over said voice channel; and
    (d) continuing (a)–(c) until said end point for said second stream of bits is reached.

11. The method of claim 9, wherein said sending comprises:
    inserting a start indicator before said start point for said second stream of bits, and an end indicator after said end point for said second stream of bits; and
    sending said second stream of bits with said start and end indicators.

12. A method to perform speech recognition, comprising:
    sending a request for speech recognition information over a wireless voice channel in a wireless network, wherein said sending comprises replacing a set of signals representing speech with speech features and sending a subrogation indicator to initiate a communication of said speech features over said wireless voice channel in said wireless network at a lower bandwidth than a bandwidth used to send said set of signals representing speech when said subrogation indicator is detected;
    receiving said speech features over said voice channel; and
    recognizing speech using said speech features.

13. The method of claim 12, wherein said sending:
    sending a prompt for a voice command.

14. The method of claim 12, wherein said subrogation indicator is a predefined pattern of bits.

15. The method of claim 12, wherein said receiving comprises:
    (a) determining a start point and end point for a stream of bits;
    (b) reconstructing said speech features from said start point;
    (c) decompressing said speech features;
    (d) sending said decompressed speech features to a speech recognition device; and
    (e) performing (a)–(d) until said end point is reached.

16. The method of claim 15, further comprising:
    extracting error correction information from said stream of bits; and
    determining whether said speech features include errors using said error correction information.

17. A system to perform speech recognition, comprising:
    a wireless source node to receive a subrogation indicator and to replace a set of signals representing speech with speech features and to send said speech features over a wireless voice channel at a lower bandwidth than a bandwidth used to send said set of signals representing speech when said subrogation indicator is detected;
    a destination node to receive said speech features and perform speech recognition; and
    a wireless network to communicate said speech features between said wireless source node and said destination node by overlaying said speech features on a wireless voice channel.

18. The system of claim 17, wherein said source node comprises:
    a transceiver to communicate information with said destination node;
    a capabilities monitor to monitor for a request for speech recognition information from said transceiver;
    a vocoder to create a first stream of bits representing speech;
    a feature encoder to create a second stream of bits representing speech features of said speech; and
    a feature overlayer to overlay said first stream of bits with said second stream of bits, and send said second stream of bits to said transceiver for communication to said destination node.

19. The system of claim 17, wherein said feature encoder comprises:
    a feature extractor to extract said speech features from said speech; and
    a feature compressor to compress said speech features into said second stream of bits.

20. The system of claim 17, wherein said destination node comprises:
    a transceiver to communicate information with said source node;
    a capabilities broadcaster to communicate a speech recognition request to said source node;
    a start monitor to monitor for a strewn of bits having speech features from said transceiver;
    a feature decoder to decode speech features from said stream of bits; and
    a speech recognition module to translate said speech features into text.

21. The speech recognition decoder of claim 20, wherein said feature decoder comprises:
    a feature reconstructer to reconstruct speech features from said stream of bits; and
    a feature decompressor to decompress said reconstructed speech features.

22. The system of claim 17, wherein said network is a wireless network.

23. A speech recognition encoder, comprising:
a capabilities monitor to monitor for a request for speech recognition information, wherein said speech recognition information comprises a subrogation indicator;
a vocoder to create a first stream of bits representing speech;
a feature encoder to create a second stream of bits representing speech features of said speech; and
a feature overlayer to overlay said first stream of bits with said second stream of bits and to communicate over a wireless voice network said second stream of bits at a lower bandwidth than a bandwidth used to communicate said first stream of bits representing said speech when said subrogation indicator is detected.

24. The speech recognition encoder of claim 23, wherein said feature encoder comprises:
a feature extractor to extract said speech features from said speech; and
a feature compressor to compress said speech features into said second stream of bits.

25. A speech recognition decoder, comprising:
a capabilities broadcaster to communicate a speech recognition request, wherein said capabilities broadcaster communicates a subrogation indicator to initiate a communication of a stream of bits having speech features over a wireless voice channel in a wireless network at a lower bandwidth than a bandwidth used to communicate a set of signals representing speech when said subrogation indicator is detected;
a start monitor to monitor for a said stream of bits having speech features;
a feature decoder to decode said speech features from said stream of bits; and
a speech recognition module to translate said speech features into text.

26. The speech recognition decoder of claim 25, wherein said feature decoder comprises:
a feature reconstructer to reconstruct speech features from said stream of bits; and
a feature decompressor to decompress said reconstructed speech features.

27. An article comprising:
a storage medium;
said storage medium including stored instructions that, when executed by a processor, result in performing speech recognition by receiving a set of signals representing speech, receiving a request for speech recognition information over a wireless voice channel in a wireless network, wherein receiving said request comprises receiving a subrogation indicator, creating a set of speech features from said signals, and when said subrogation indicator is detected: replacing said set of signals representing speech with said speech features; and communicating said speech features over said wireless voice channel in said wireless network at a lower bandwidth than a bandwidth used to send said set of signals representing said speech.

28. The article of claim 27, wherein the stored instructions, when executed by a processor, further result in receiving said request by receiving a prompt for a voice command.

29. The article of claim 27, wherein the stored instructions, when executed by a processor, further result in said creating by extracting said speech features from said signals, and compressing said speech features.

30. The article of claim 27, wherein the stored instructions, when executed by a processor, further result in said communicating by creating a first stream of bits representing said speech, receiving a second stream of bits representing said speech features, replacing said first stream of bits with said second stream of bits, and sending said second stream of bits over said voice channel.

31. The article of claim 30, wherein the stored instructions, when executed by a processor, further result in said creating by receiving an analog audio waveform representing said speech, converting said analog audio waveform into a digital audio signal, and compressing said digital audio signal using a voice encoding algorithm.

32. The article of claim 30, wherein the stored instructions, when executed by a processor, further result it, said replacing by determining a start point and an end point for said first stream of bits, determining a start point and an end point for said second stream of bits, and replacing said first stream of bits with said second stream of bits using said start points and said end points.

33. The article of claim 32, wherein the stored instructions, when executed by a processor, further result in said replacing said first stream of bits with said second stream of bits using said start points and said end points by (a) creating a frame of bits from said start point for said first stream of bits, (b) overlaying said frame of bits with said start point for said second stream of bits, (c) sending said frame of bits over said voice channel, and (d) continuing (a)–(c) until said end point for said second stream of bits is reached.

34. The article of claim 32, wherein the stored instructions, when executed by a processor, further result in said sending by inserting a start indicator before said start point for said second stream of bits, and an end indicator after said end point for said second strewn of bits, and sending said second stream of bits with said start and end indicators.

35. An article comprising:
a storage medium;
said storage medium including stored instructions that, when executed by a processor, result in performing speech recognition by sending a request for speech recognition information over a wireless voice channel in a wireless network, wherein said sending comprises replacing a set of signals representing speech with speech features and sending a subrogation indicator to initiate a communication of said speech features over said wireless voice channel in said wireless network at a lower bandwidth than a bandwidth used to send said set of signals representing speech when said subrogation indicator is detected, receiving said speech features over said voice channel, and recognizing speech using said speech features.

36. The article of claim 35, wherein the stored instructions, when executed by a processors further result in said sending by sending a prompt for a voice command.

37. The article of claim 35, wherein the stored instructions, when executed by a processor, further result in said receiving by (a) determining a start point and end point for a stream of bits, (b) reconstructing said speech features form said start point, (e) decompressing said speech features, (d) sending said decompressed speech features to a speech recognition device, and (e) performing (a)–(d) until said end point is reached.

38. The article of claim 37, wherein the stored instructions, when executed by a processor, further result in extracting error correction information from said stream of bits, and determining whether said speech features include errors using said error correction information.

* * * * *

UNITED STATES PATENT AND TRADEMARK OFFICE
CERTIFICATE OF CORRECTION

PATENT NO. : 7,139,704 B2  Page 1 of 1
APPLICATION NO. : 10/000228
DATED : November 21, 2006
INVENTOR(S) : Graumann It is certified that error appears in the above-identified patent and that said Letters Patent is hereby corrected as shown below:

Column 12, line 53, in Claim 20, delete "strewn" and insert -- stream --, therefor.

Column 13, line 53, in Claim 27, after "features" delete ";" and insert -- : --, therefor.

Column 14, line 12, in Claim 32, delete "it," and insert -- in --, therefor.

Column 14, line 32, in Claim 34, delete "strewn" and insert -- stream --, therefor.

Column 14, line 51, in Claim 36, delete "processors" and insert -- processor, --, therefor.

Column 14, line 56, in Claim 37, delete "form" and insert -- from --, therefor.

Signed and Sealed this

Twentieth Day of February, 2007

JON W. DUDAS
*Director of the United States Patent and Trademark Office*